United States Patent [19]
Cerbell

[11] Patent Number: 6,124,980
[45] Date of Patent: Sep. 26, 2000

[54] LIQUID MODULAR LENS FOR CONDENSING SOLAR ENERGY

[76] Inventor: Roberto Santander Cerbell, Calle Rafael Mesa y Lopez, 63-2° C., E-35012, Las Palmas de Gran Canaria, Spain

[21] Appl. No.: 08/981,977
[22] PCT Filed: May 8, 1997
[86] PCT No.: PCT/ES97/00119
  § 371 Date: Mar. 30, 1998
  § 102(e) Date: Mar. 30, 1998
[87] PCT Pub. No.: WO97/42452
  PCT Pub. Date: Nov. 13, 1997

[30] Foreign Application Priority Data

May 8, 1996 [ES] Spain ..................................... 9601033
Mar. 7, 1997 [ES] Spain ..................................... 9700507

[51] Int. Cl.[7] .............................. G02B 1/06; G02B 15/14
[52] U.S. Cl. ..................... 359/665; 359/698; 359/699; 359/700
[58] Field of Search ................... 126/698–700; 359/665, 741

[56] References Cited

U.S. PATENT DOCUMENTS 4,167,937  9/1979  Bergkvist .
4,249,516  2/1981  Stark .

FOREIGN PATENT DOCUMENTS

2412859  7/1979   France .
2464439  3/1981   France .
9700507  of 0000  Spain .
9101791  7/1991   Spain .
9402313  11/1994  Spain .
9502166  11/1995  Spain .
9601033  5/1996   Spain .
WO9615411 5/1996  WIPO .

*Primary Examiner*—Hung Xuan Dang
*Assistant Examiner*—Michael Lucas
*Attorney, Agent, or Firm*—Christie, Parker & Hale, LLP

[57] ABSTRACT

A condenser of solar energy on a moving structure, with east-west solar tracking and a modular liquid lens, the former consisting of a system capable of concentrating the solar energy by the incorporation of one or several modular liquid lenses, and the latter comprised by the connection of different transparent lenticular recipients, capacitated for installation on a metallic structure of spherical or cylindrical shape which, by means of the action of a divergent lens and a liquid prism transmits the heat to the fluid in a primary circuit which by means of a heat exchanger provides the temperature necessary for the different energy uses.

18 Claims, 11 Drawing Sheets

LIQUID MODULAR LENS FOR CONDENSING SOLAR ENERGY

OBJECT OF THE INVENTION

This descriptive report refers to a condenser of solar energy which incorporates a large size modular liquid lens, using the property possessed by fluids of refracting and concentrating light when they are delimited by curved transparent surfaces, i.e., this is a lens conformed by different transparent lenticular recipients of shapes, dimensions and curvatures which permit, in their combination, the configuration of a modular liquid lens with a focal distance which is appropriate and capacitated to be placed on a moving or fixed structure, with this structure adjusted to the characteristics of the modular liquid lens thus constituted, permitting its construction in large dimensions, without limitation of thicknesses and shapes, having at the same time the quality of being manufactured at low cost in comparison with other known lenses of similar optical characteristics, developed with other materials and providing the concentration of the solar flux corresponding to large surface areas.

It is also the object of the invention to permit the condensation of solar rays of a certain surface area on a heat absorber, and to provide sufficient energy to the fluid which circulates through the secondary circuit thereof, in order to raise its temperature beyond its boiling point with the object of permitting its use as thermal fluid in an electricity production turbine, in a water desalinization plant or in any other application which requires steam of high enthalpy.

The invention possesses a condensation system based on modular liquid lenses which considerably cheapens the cost of its installation compared with conventional lenses, also being provided with a tracking and guidance system which permits the total harnessing of the impinging rays, which always act in the most efficient form in the heat exchanger.

FIELD OF THE INVENTION

This invention has its field of application within the industry dedicated to the harnessing of solar energy by its concentration, both in the manufacturing of lenses, as elements and devices for that purpose, and within the optics industry and, in general, in all applications in which lenses of large dimensions are required, it being equally possible to use it in the industry dedicated to the manufacturing of condensers of solar energy.

BACKGROUND TO THE INVENTION

It is known that by means of the use of a transparent lenticular recipient with a refracting liquid in its interior, similar effects of concentration of solar light are achieved to those obtained with a conventional optical lens, but to date this physical principle has only been approached on a small scale, which is not viable for industrial usage due to its very high cost.

Since the objective of this invention is the harnessing of large magnitudes of solar flux, in order to obtain high temperatures and a great concentration of energy, it is necessary to use lenses of large dimensions, of an appropriate design, which optically, and with a low manufacturing cost, permit an economically viable use for industrial purposes, such as the obtainment of electrical energy, desalinization, depuration, treatment of wastes, applications in the field of medicine, optics in general, production of hydrogen, cogeneration of energy, etc.

The applicant also knows of the existence of patents which develop some of the elements which are used in condensers of solar energy on a moving structure, among which the following may be pointed out.

Spanish Patent No. 9101791, of Jul. 30, 1991, which sets forth the idea of being able to concentrate the solar flux by means of lenses which have the particularity of being configured as lenticular recipients of transparent material which, when filled with a transparent fluid, semi-solid material or solidifiable material, refract the direct or previously reflected light in a way which is similar to that achieved with an ordinary lens, with the consequent cheapening of costs, integrating these ideas in a body which is materialized in the so-called "liquid lens".

Spanish Patent No. 9402313, of Nov. 10, 1994, which basically touches upon the possibility that the mechanism capable of harnessing solar energy by means of the use of liquid lenses will be constituted by a moving or fixed supporting structure.

Spanish Patent No. 9502166, of Nov. 7, 1995, which perfects the former, analysing some characteristics of the liquid lens.

Spanish Patent No. 9601033, of May 8, 1996, which defines the characteristics of a modular liquid lens which permits the construction of liquid lenses of large size, adequate for the purposes of harnessing solar rays on large surface areas.

Spanish Patent No. 9700507, relating to a Modular Liquid Lens on a moving structure, with solar tracking.

The aforementioned patents characterize elements for harnessing and directing solar rays by means of the incorporation of liquid lenses or modular liquid lenses, which will be integrating parts of the invention which comprises the subject matter of this descriptive report, this being a much broader conception and with a utility defined by its constitution.

On the other hand, the applicant knows of the existence of systems which permit the harnessing of solar energy in order to produce electricity, potabilize water or even configure very high temperature ovens by means of the condensation of solar rays, but all of them incorporate reflecting elements of the type comprised by concave and flat mirrors and reflecting elements of the type comprised by solid lenses, constituted on the lines dictated by the use of materials such as glass or quartz, of very high weight, costly and not apt for configuring collectors of large dimensions.

The evident solution to the problems existing in this field would be that of being provided with a condenser of solar energy fitted with modular liquid lenses, of low weight, lower cost than the solid lenses, and structurally apt for the harnessing of large magnitudes of solar flux.

At the same time it would be desirable also to be provided with a mechanism which orients the energy condenser towards the sun at all times, for the maximum harnessing of the solar flux.

However, the applicant has no knowledge of the existence at the present time of an invention which is provided with all the characteristics indicated above as suitable.

DESCRIPTION OF THE INVENTION

The condenser of solar energy which the invention proposes constitutes in itself an evident novelty within the field of application in which it is incorporated, as on the basis of a modular liquid lens with fluid in its interior, of large dimensions, appropriate shapes and characteristics, capacitated to perform its function in an optimum manner, at a low manufacturing cost and to be used as a large collector of solar energy, placed on an appropriate structure, mobile with solar tracking or fixed without solar tracking, which permits the concentration of a large quantity of solar flux at high temperature.

The modular liquid lens which forms the subject matter of this invention can be constructed with lenticular recipients of different transparent materials capable of being molded, such as sheets of glass, organic plastic materials, inorganic materials, and other similar materials.

The thickness of these sheets must be appropriate in accordance with the internal pressure and external conditions which they have to withstand and the resistance characteristics of the material used.

The surfaces of the modular lens—curved, warped, flat or mixed, spherical or cylindrical, etc.—will be given in accordance with the type of focus which it is intended to obtain, i.e.: circular, elliptic, longitudinal, etc. and will have the curvature appropriate for the projected distance in each case.

The plan form of this modular lens may be: circular, polygonal, elliptic, parabolic, etc., and will be in accordance with the needs of projection.

The modular liquid lens may be configured as a toric body of revolution, of total or partial development, of an appropriate section in accordance with its size and shape, which provides one or several centered focal points according to needs.

When it is necessary to capture the flux of solar energy on an element or body in movement, use will be made of the complete toric modular lens, or of total development, in the form of a dome or spherical cap, complete or flattened.

If the harnessing is to be carried out in a static way, it will be possible to use the toric modular liquid lens of partial development, whose dimensions will vary according to the needs of the surface area destined for harnessing The construction of the modular liquid lens will be carried out on the basis of one or several individual recipients, whose shape and size will depend on the total dimensions of the modular liquid lens to be obtained, it being possible for these recipients to be communicated with each other by means of the necessary orifices and connections in their faces, in such a way as to permit their total or partial filling with the refracting liquid.

With the aim of achieving several different focal distances with one single large size modular lens, each one of the individual recipients which comprise the lens may in turn be horizontally divided in its interior, in order to be filled simultaneously or alternately, and thus may be divided vertically or transversally according to the needs of obtaining the adequate focal distances.

As a consequence of this, it is possible to obtain shapes and optical combinations such as the lenticular prism, mixed or multiple lens, convergent-divergent lens, and others, on the basis of the different alternatives of filling or emptying of the configured recipients.

It is also possible to obtain a single focal point with a nonhomogenous lens or lens of compound shape and variable section.

Any necessary joints between the different recipients will be executed by means of the use of adhesive material, solderable material or molds, which in turn provide sufficient tightness and durability of the set of recipients which comprise the modular liquid lens, it being possible to use joints which are elastic, rigid, semirigid, of smelted materials, self-supporting or with the addition of a supporting structure, executed using the appropriate sections to permit the conformation of the modular lens.

The modular lens, which consist of a set of lenticular recipients assembled together, may adopt the usual shapes of lenses: convergent (biconvex, planoconvex, concave-convex) or divergent (concave, planoconcave, convex-concave).

The color and the texture of the aforementioned materials with which the lenticular recipients are constructed, is not in any way relevant, provided that they permit the concentration of the solar light with the greatest efficiency, it being possible to incorporate any material, product or anti-reflective device either on the surface or incorporated in the refracting fluid.

The assembly formed by the modular lens and its supporting structure may be provided with whatever fastening, hinging or turning elements may be necessary, independently of whether the elements used are its own or added, in order to facilitate its use, both static and dynamic.

The refracting fluid may be comprised by gas, water or any other refracting liquid, semiliquid or solidifiable material, and will have the adequate composition to withstand the atmospheric and climatological conditions to which it is to be subjected, it being in this respect possible to incorporate anti-freeze, coolants or any other substance which contributes to the optimum conditions for its operation.

The incorporation of the toric shape modular lens of partial development to the moving structure permits the use of a purely electromechanical solar tracking system, of low cost, due to the high tolerance which this wide angle modular lens provides, in the harnessing of large amounts of solar energy flux, with the consequent economic savings.

Also an object of the invention is the modular liquid lens constituted by a series of recipients which configure a central lenticular disc and several lenticular crowns which surround it, all assembled by means of the provision of a structure which gives it a spherical or cylindrical shape (dome or vault).

The characteristics of the modular liquid lens permit it to behave in the same way as a conventional lens but with a clearly lower weight and thickness.

In the vertical trajectory of the light source a liquid prism is provided which diverts by refraction the light beam towards a fixed point in the installation where the absorbent is located, the light source may also be diverted by a reflection system, all of which is arranged on a curved sliding rail.

At the focus a divergent liquid lens is positioned whose mission is to transform the light source into a beam of parallel rays which is made to impinge upon one of the faces of the liquid prism or refracting plate for its diversion towards the absorbent.

The assembly comprised by a divergent liquid lens and the liquid prism is provided with linear movement along the length of the sliding rail in order to permit the tracking of the light beam throughout its vertical path.

The beam of parallel rays refracted from the liquid prism, impinges on an absorbent which contains a thermal plate which receives the solar energy and transmits the calorific energy to a circulating fluid; the chamber where the absorbent resides being provided with at least one selective window at its entrance to minimize the loss of energy by emittance, and being provided also with a vacuum chamber which prevents losses of heat.

The receptor fluid, which receives the solar energy condensed on the absorbent, circulates through a primary circuit which has a heat exchanger which transfers the heat to a secondary circuit which contains the fluid destined for the production of electrical energy or any other use, process or procedure which requires the use of high pressure and high temperature steam.

The condenser of solar energy is provided with a device or system for the east-west rotation of the assembly, which permits it to turn following the trajectory of the sun, and the assembly formed by the prism and the lens is provided also with equipment for tracking the light source.

Finally, the invention is also provided with a secondary heat production circuit which supplements the aforementioned solar powered system with a combustion system using as fuel either gas, diesel, coal or any other commonly used fuel.

DETAILED DESCRIPTION OF THE INVENTION

Figure 1:
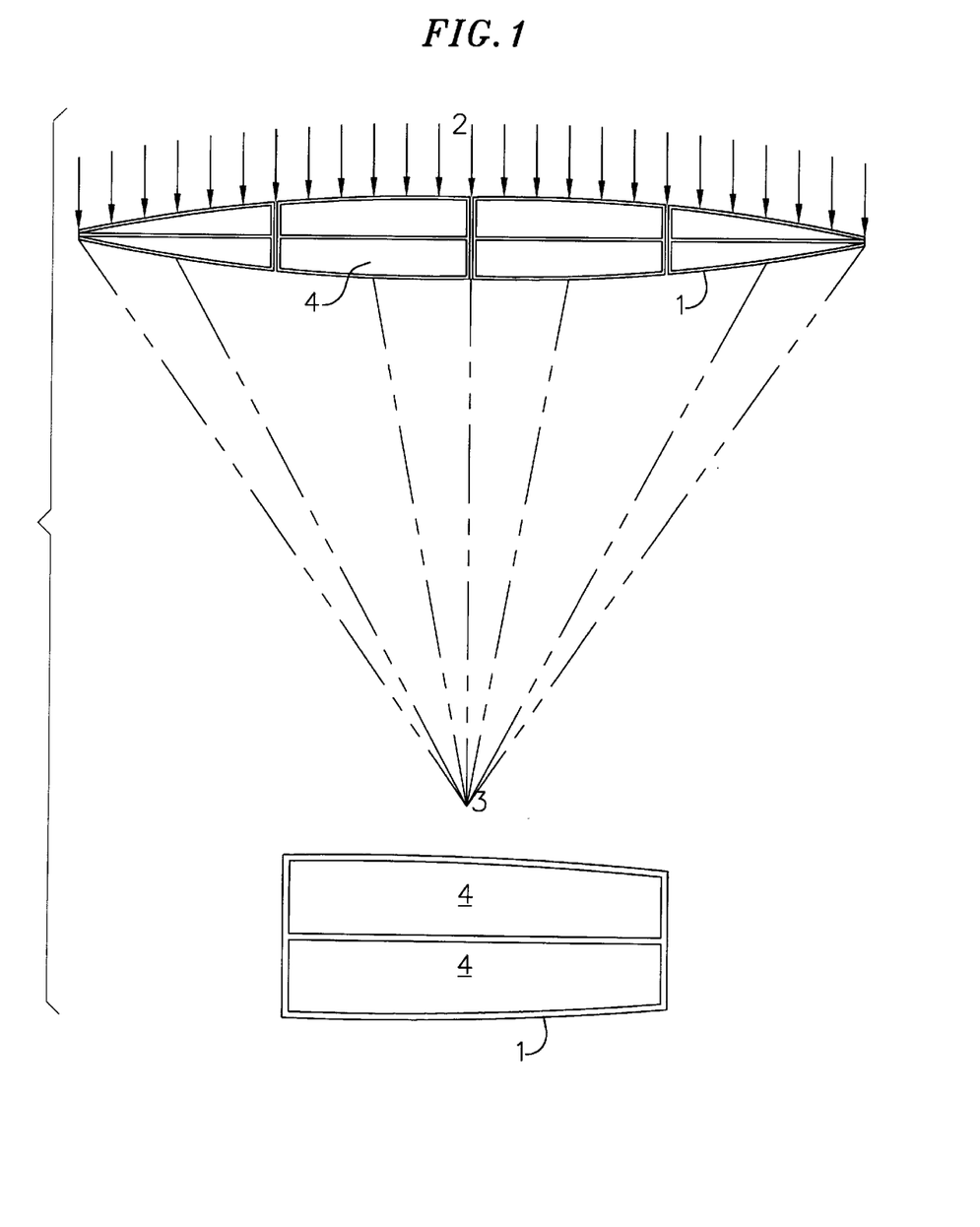
FIG. 1 shows the general diagram, cross-sectional view of the subject matter of the invention, referring to the modular liquid lens, condenser of solar energy, representing a large size modular lens, of the convergent type, a graphic representation which is given by way of example, it being possible to give a diversity of similar representations, varying the configuration, which can present any type of cross section of convergent or divergent characteristics and the combinations of these.

In view of FIGS. 1, 2, 3, 4, 5, 6 and 7, it may be seen how the modular liquid lens, condenser of solar energy, is configured on the basis of a body constituted by a large size modular lens, represented in FIG. 1, comprised by a set of transparent lenticular recipients (1), of adequate types, dimensions and curvatures, which by means of the incorporation in their interior of a refracting fluid (4), permit the obtainment of an appropriate focal distance, providing the concentration, in one or two small size focuses, of the solar flux (2) corresponding to large surface areas, without limitation of thicknesses and shapes, being manufactured of different transparent materials, susceptible to molding, it being possible for the modular liquid lens to adopt the usual shapes of convergent or divergent lenses in all their types and it being capacitated to be placed on a moving structure with solar tracking or a fixed structure without solar tracking.

Figure 2:
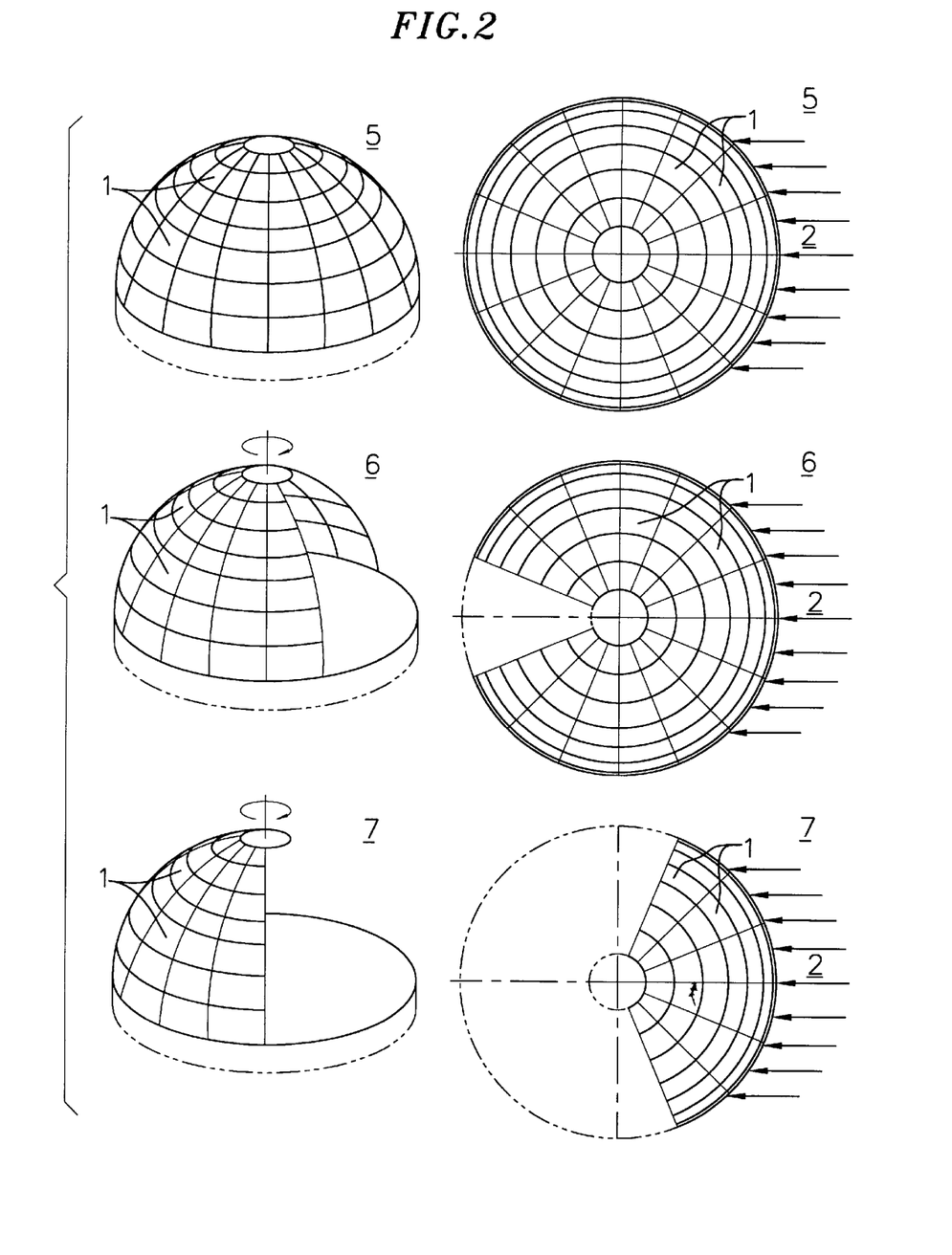
FIG. 2 shows plan and perspective views of the toric section modular lens of total and partial development.
Figure 3:
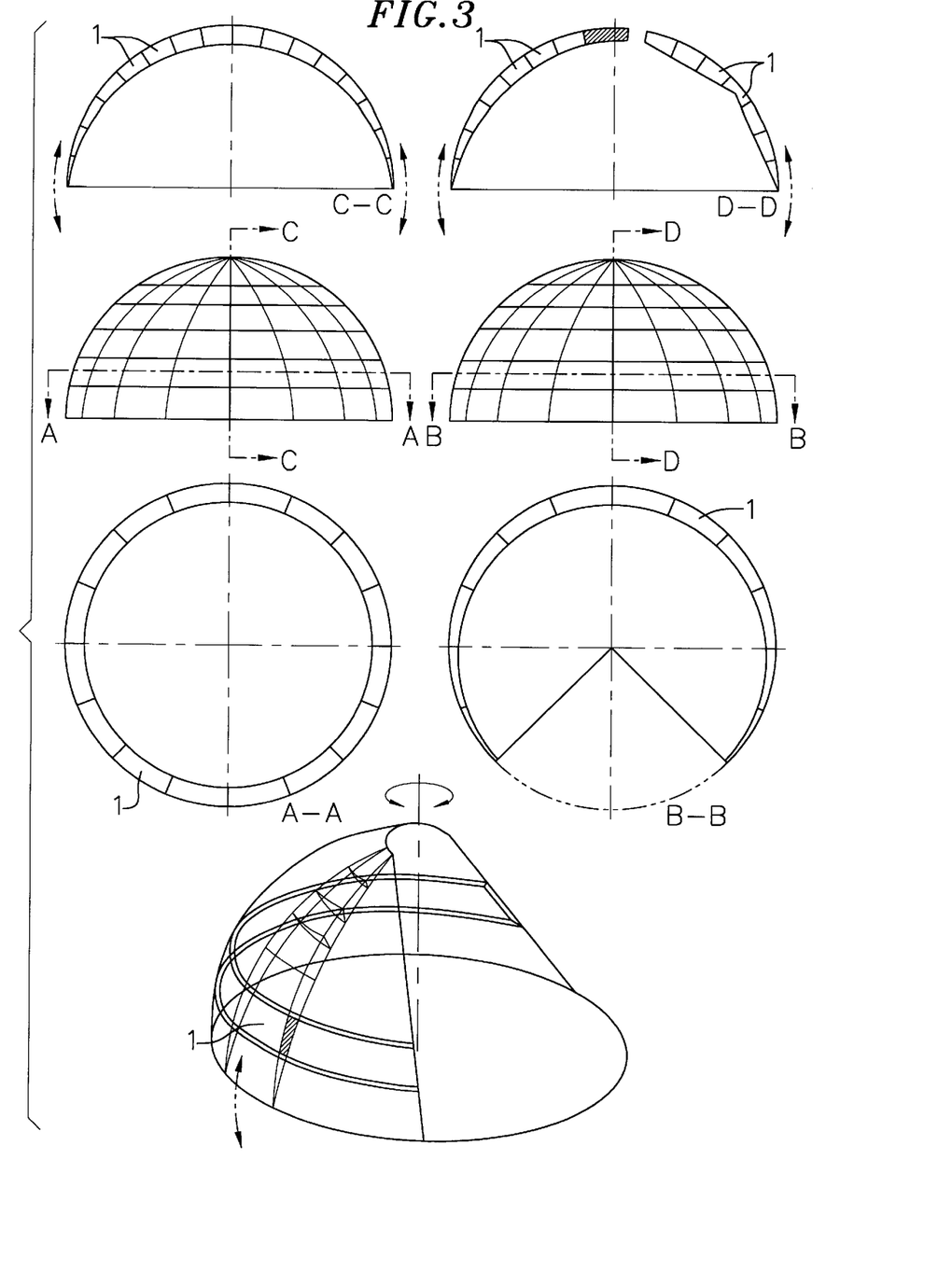
FIG. 3 shows horizontal and vertical cross sections of the toric form modular lens of total or partial development and the prespective view of a cross-sectioned sector of this lens, as well as a detail in prespective view of one of the forms which can be adopted by the lenticular recipients.

The modular liquid lens as a whole may adopt any plan form: circular, polygonal, elliptic, parabolic, etc., depending on the needs of projection, it being possible to configure the lens by the connection of different toric bodies of revolution, generated by the sections of the lenticular recipients represented in FIG. 2, engendered by the surface comprised between the intersection of two nonconcentric circles, turning on the axis of the exterior circle, totally or partially, being extendible in the same way when the interior circle is replaced by a straight or broken line turning on the axis of the exterior circle represented in FIG. 3, in such a way that, when its development is complete, it may generate a body in the form of a spherical cap or dome, complete or flattened, without limitation of sizes, in accordance with the needs of harnessing the solar flux.

Figure 4:
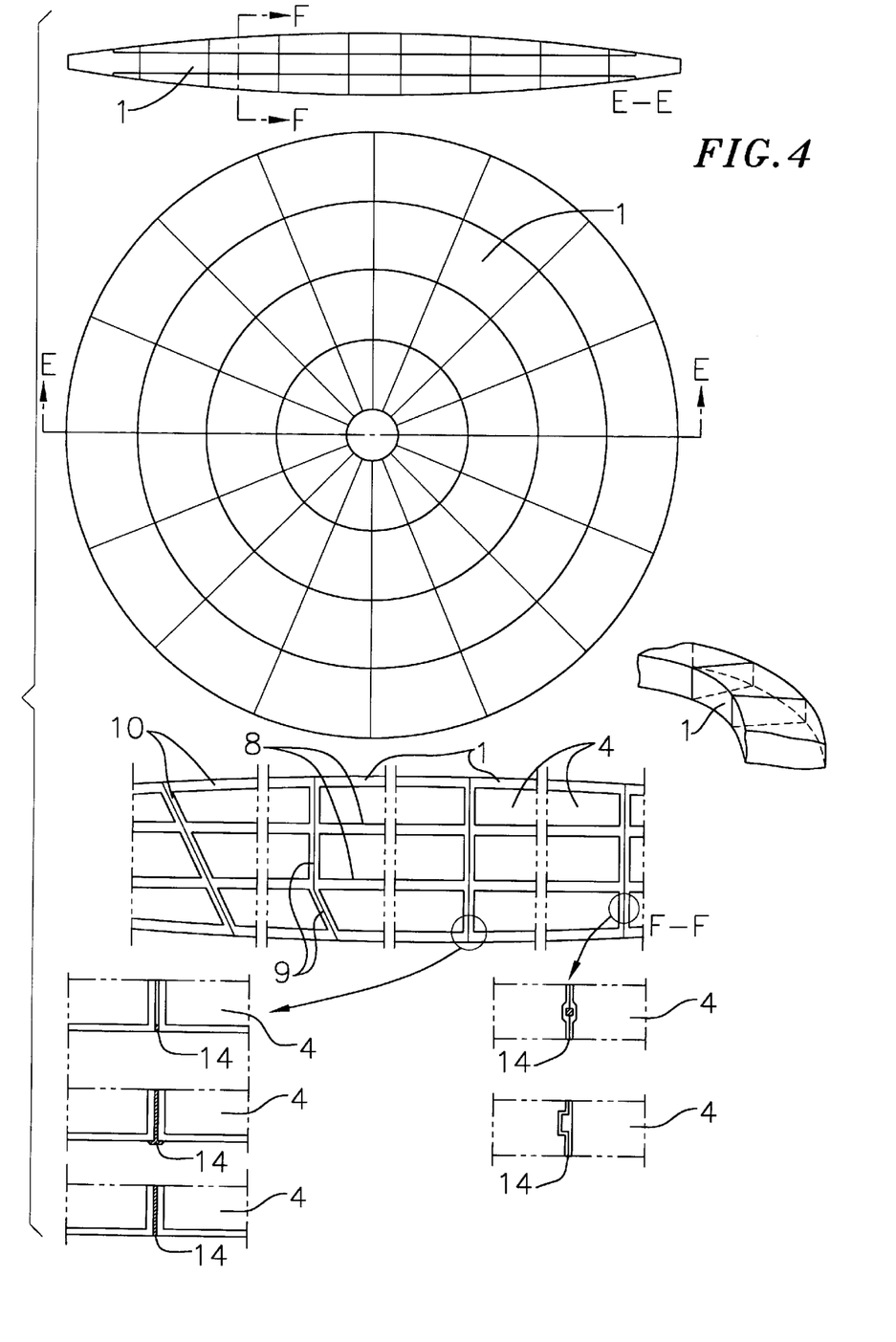
FIG. 4 shows a plan and cross-sectional diagram of a large size modular lens of biconvex convergent type, comprised by different lenticular recipients and details of the assembly, joints and supporting structure of these recipients, as well as sealing of connections and filling and emptying orifices.

The lenticular recipients (1), which together comprise the modular liquid lens, will be manufactured of transparent materials susceptible to be molded by any method of warping, blowing, etc., such as sheets of glass, organic plastic materials, inorganic materials or similar, with an appropriate thickness in accordance with the internal pressure and external conditions which they must withstand and of the resistance characteristics of the material used, adopting the adequate geometry; these lenticular recipients being assembled together in a self-supporting form or with the addition of a structure made of sections of the appropriate material which together form the intended modular lens, as is represented in FIG. 4.

Figure 5:
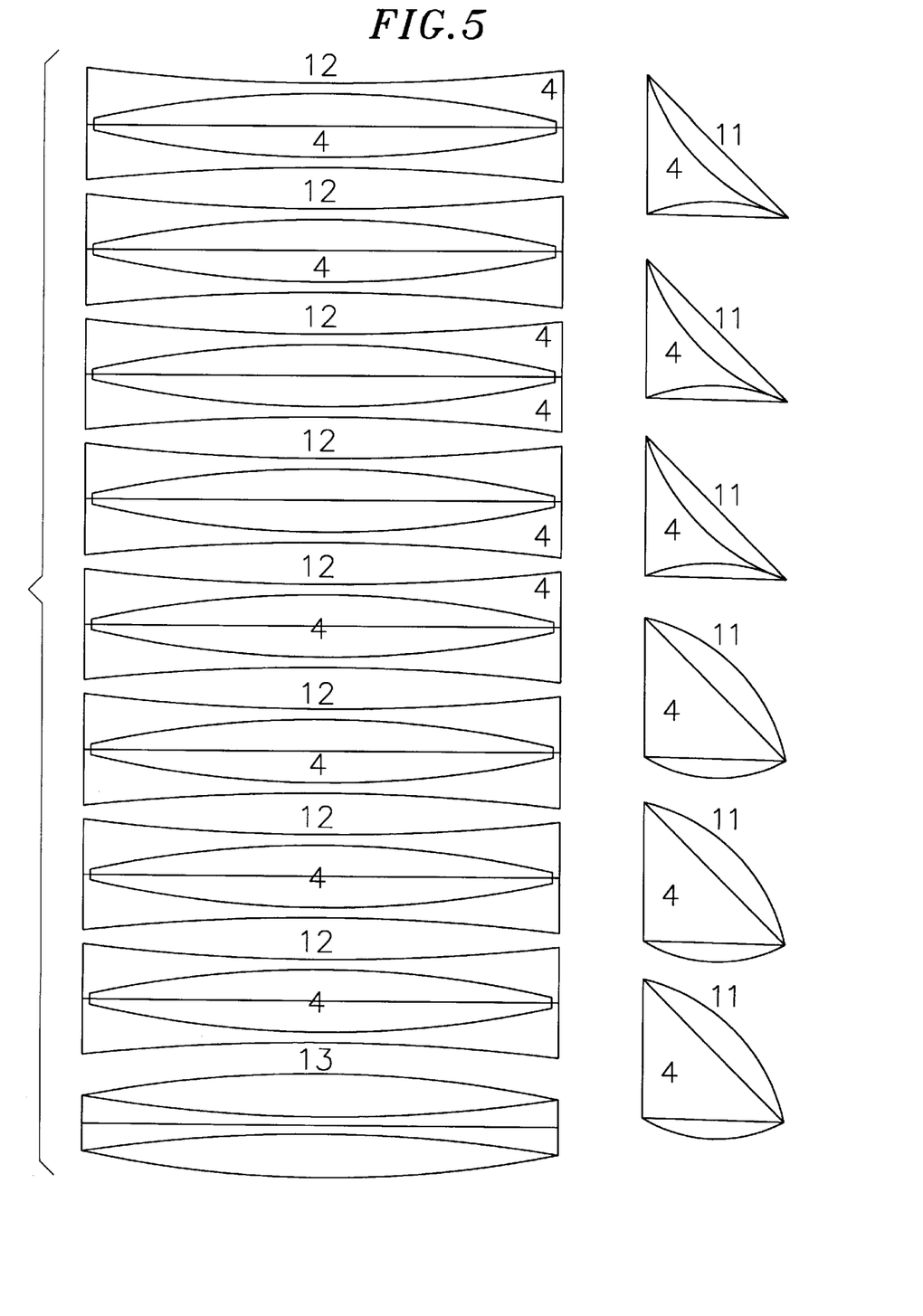
FIG. 5 shows a view of the different shapes and optical combinations on the basis of the configuration of the lenticular recipients and their filing alternatives, such as the lenticular prism and the mixed or multiple convergent-divergent lens and others.

The modular recipients (1), which constitute the modular liquid lens, may in turn be subdivided horizontally (8), vertically or transversally in their interior, in any direction (9), in order to be able to be filled or emptied simultaneously or alternately with the refracting fluid (4), in accordance with the needs of obtaining different focal distances with the modular liquid lens, for which purpose the recipients will be provided with the necessary orifices and connections in their faces or joints (10), obtaining forms and optical combinations (as represented in FIG. 5) such as the lenticular prism (11) in all its variants, the mixed or multiple convergent-divergent lens (12), and others (13), according to the different alternatives of filling or emptying of the configured recipients.

Figure 6:
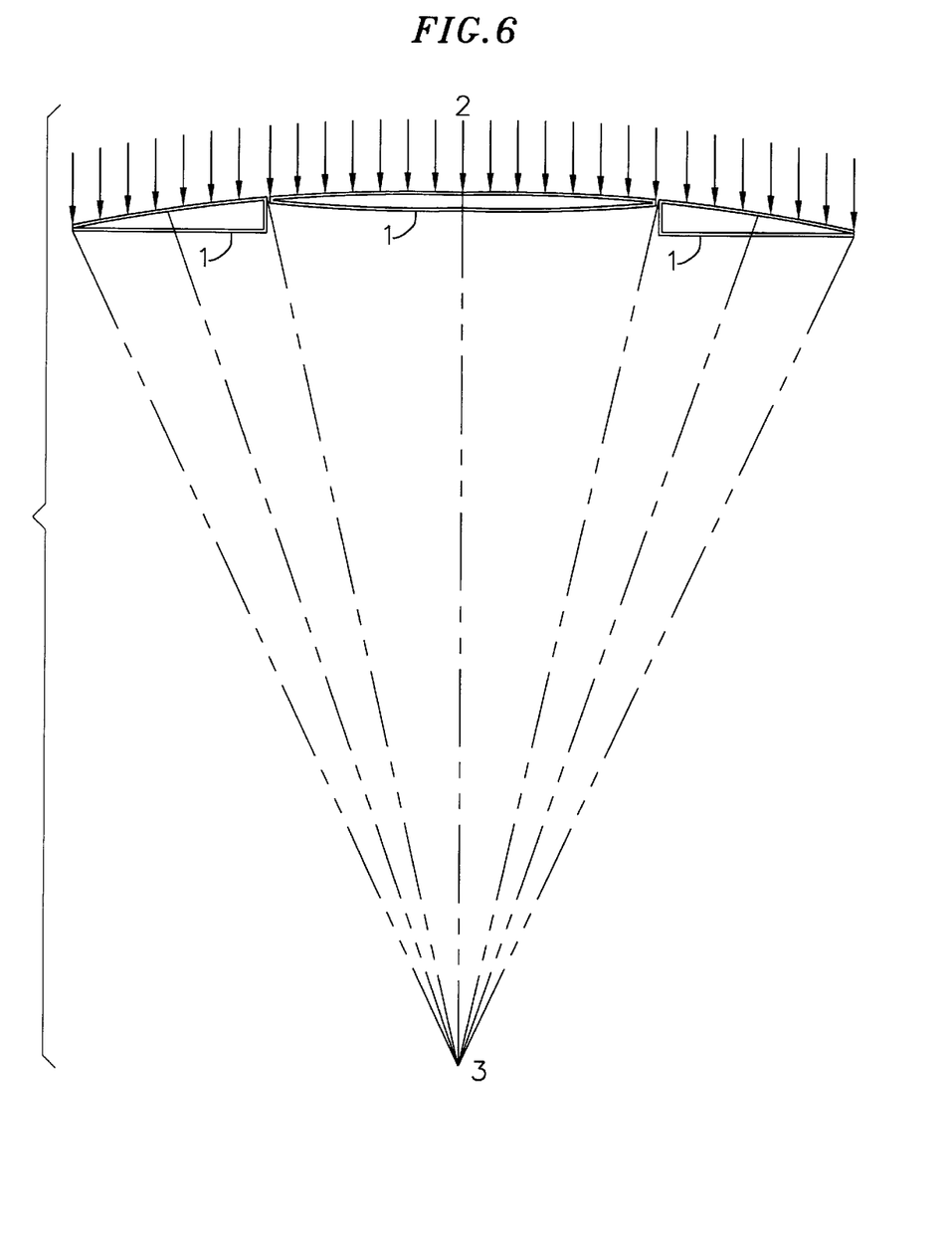
FIG. 6 shows diagram of a nonhomogenous or compound shape modular lens, of variable section.

The use of the lenticular recipients (1) described above permits the construction of the modular liquid lens of nonhomogenous or compound section, represented in FIG. 6, with a single focus (3).

Any joints (14) between the different lenticular recipients (1) that may be necessary will be executed by means of the use of adhesive material, solderable material or molds, which in turn provide sufficient tightness and durability of the set of recipients which comprise the modular liquid lens, it being possible to use joints which are elastic, rigid, semirigid, of smelted materials, self-supporting or with the addition of a supporting structure, executed using the appropriate sections to permit the conformation of the modular lens.

The color and texture of the aforementioned materials with which the lenticular recipients are constructed is in no way relevant, provided that they permit the concentration of the solar light with the greatest efficiency, it being possible to incorporate any material, product or anti-reflective device either on the surface or incorporated in the refracting fluid (4).

The refracting fluid (4) may be comprised by gas, water or any other liquid, semiliquid or solidifiable refracting component, and will have the appropriate composition to withstand the atmospheric and climatological conditions to which it is to be subjected, it being in this sense possible to incorporate antifreeze, coolants or any other substance which contributes to the optimum conditions necessary.

The assembly formed by the modular lens and its supporting structure may be provided with whatever fastening, hinging or turning elements may be necessary, independently of whether the elements used are its own or added, in order to facilitate its use, both static and dynamic.

The incorporation of the toric shape modular lens of partial development (6) and (7) in the moving structure, permits, due to the high tolerance which this wide angle modular liquid lens provides, the use of low-cost, purely electromechanical solar tracking equipment in the harnessing of large amounts of solar energy flux, with the consequent economic savings.

Figure 7:
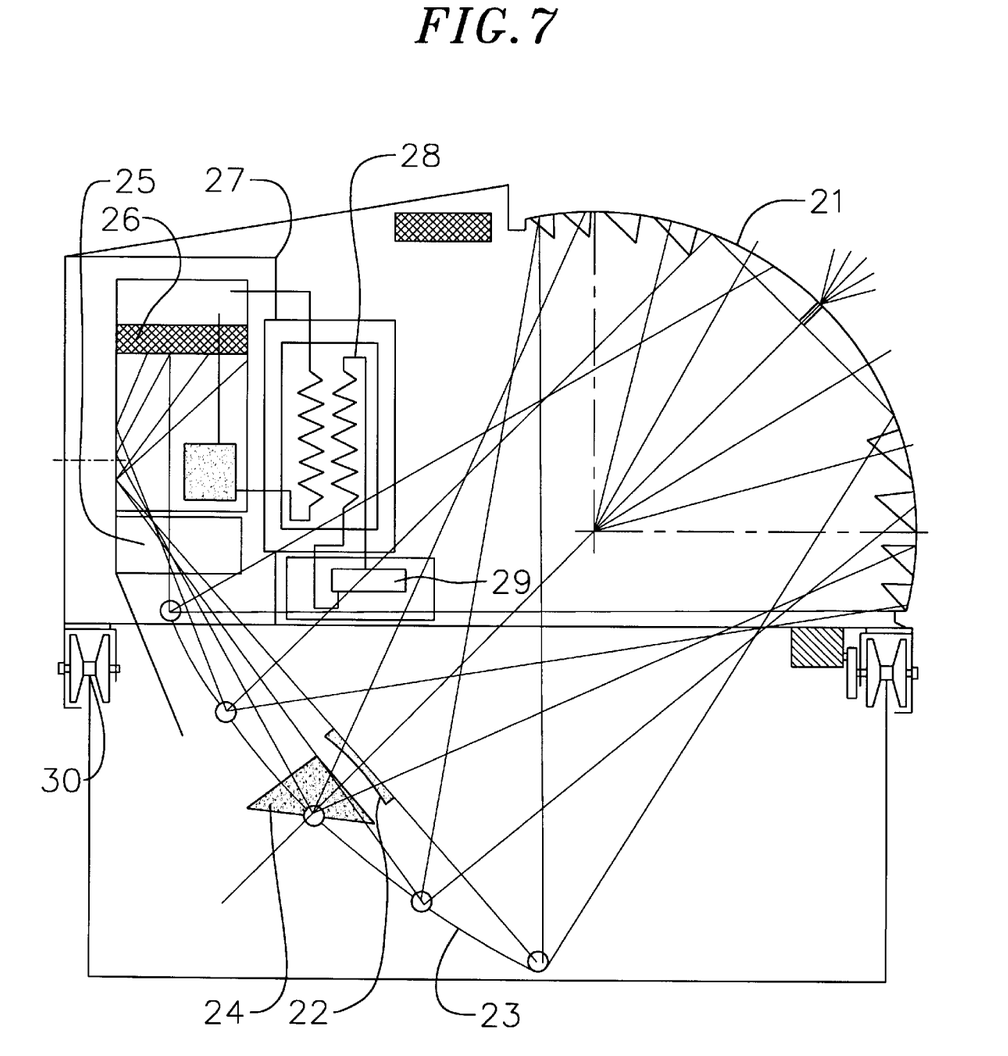
FIG. 7 shows a general diagram of the constitution of the solar energy condenser moving structure in which the modular liquid lens is applied.
Figure 8:
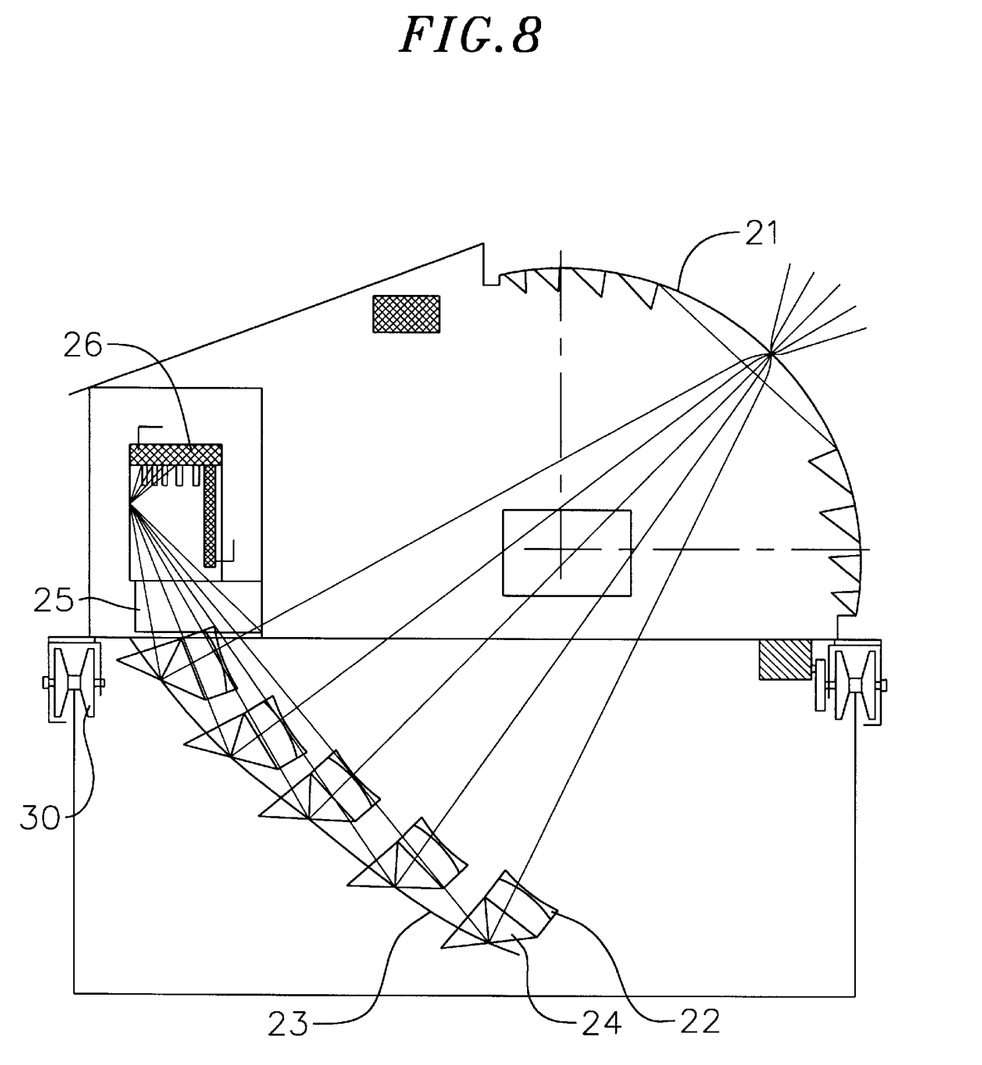
FIG. 8 illustrates the different positions which may be acquired by the refracting liquid prism and the divergent liquid lens in the tracking of the solar rays.
Figure 9:
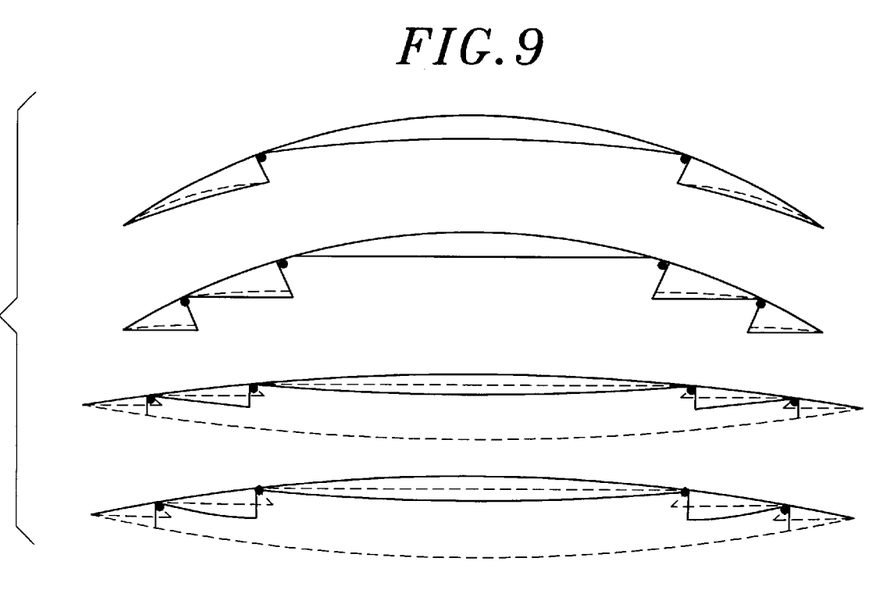
FIG. 9 shows, by way of example, different modular liquid lenses.
Figure 10:
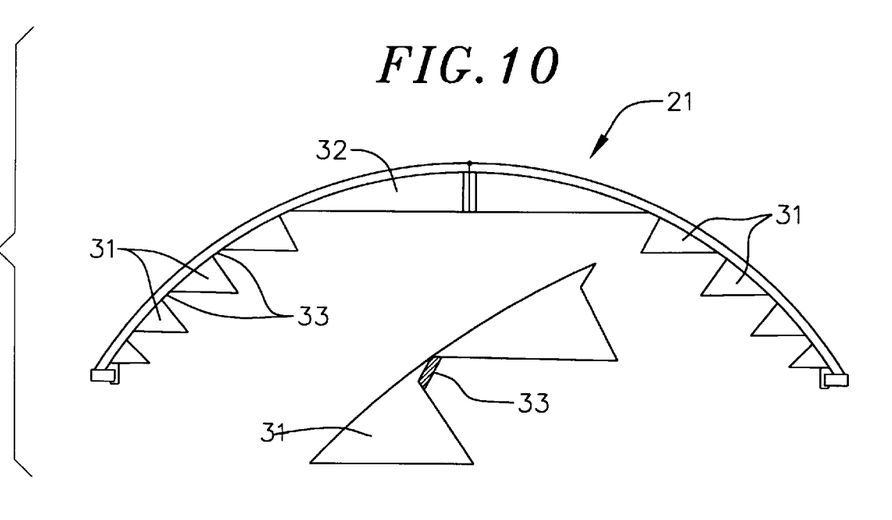
FIG. 10 shows the form or method of the joint between two adjacent sections of the modular liquid lens.
Figure 11:
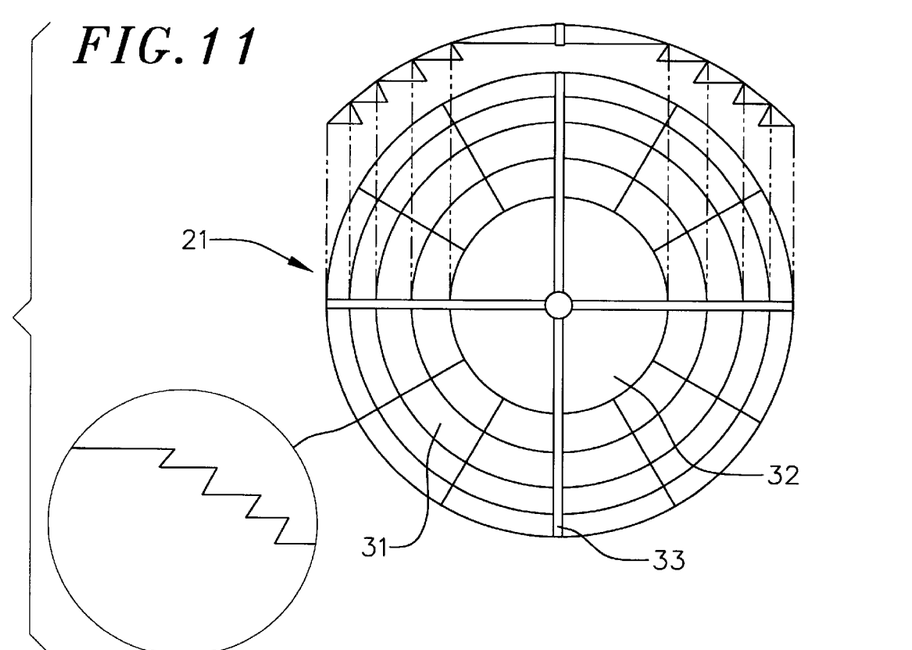
FIG. 11 shows a plan and a section view of the modular liquid lens in FIG. 10.
Figure 12:
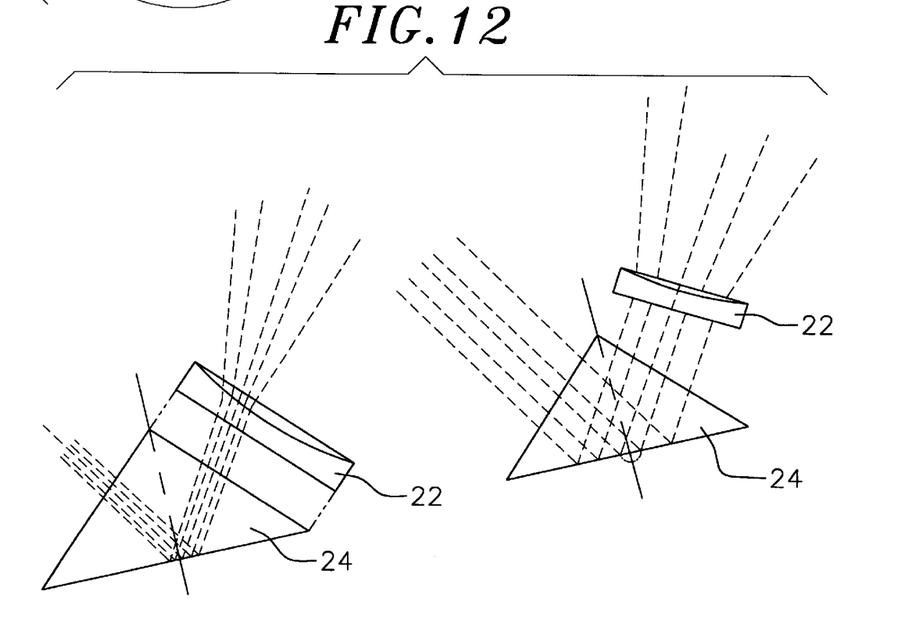
FIG. 12 shows the conversion of the light source into a beam of parallel rays by means of the divergent liquid lens, and their refraction by the liquid prism.
Figure 13:
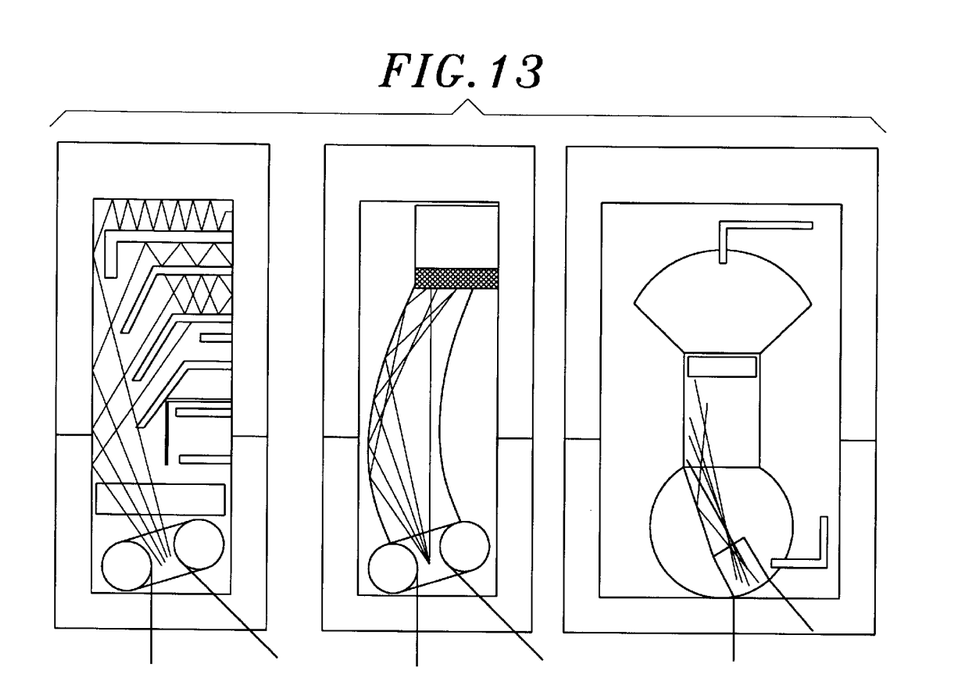
FIG. 13 illustrates some possibilities of concentration of the solar energy within the absorbent.
Figure 14:
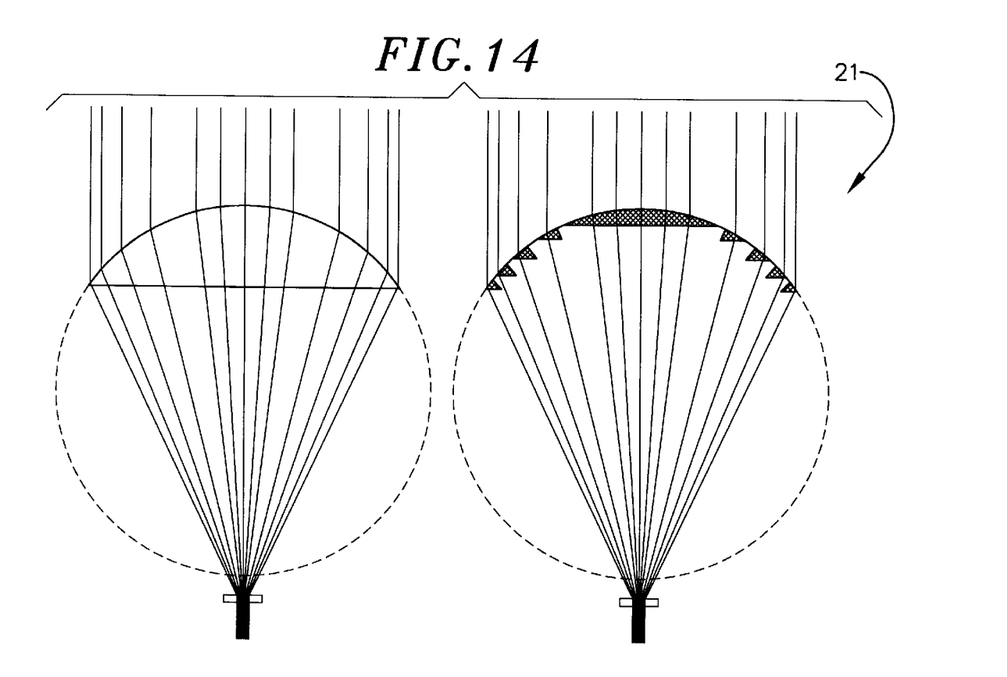
FIG. 14 shows, finally, the concentration of the solar flux by means of a conventional lens and using a modular liquid lens in it, the similitude between their focal distance and their notable difference in thickness can be seen.

Following FIG. 7, it is possible to observe the condenser of solar energy, which has one modular liquid lens (21) which concentrates the solar rays at an interior point; however, at a point close to the focus, the beam is intercepted by a divergent liquid lens (22), which transforms it into a parallel beam which is diverted by the liquid prism (24) which moves along the curved structure (23) following the solar rays which change their angle of impingement in accordance with the movement of the sun.

The parallel beam impinges on an absorber (26), after passing through a selective window (25), which is intended to minimize the heat losses of the absorber (26).

The absorber (26) transfers the heat to the fluid in a primary circuit (27) which, by means of an exchanger, transfers the heat to a secondary fluid (28) which uses it for any use which requires high pressure and high temperature steam, being provided with at least one selective window and housed within a vacuum chamber, in order to minimize losses of heat by radiation.

The modular liquid lens (21), formed by different glass recipients, has the appropriate thickness and characteristics to permit the maximum transmissivity and the structural strength necessary to withstand the interior pressure of the fluid and the stresses derived from its constitution and method of fixture.

The modular liquid lens (21) is constituted on the basis of a plurality of lenticular recipients, positioned concentrically to a central lenticular disc (32) and mounted on a reticular structure (33), executed preferentially in steel or aluminium of high strength.

The advantages of the modular liquid lenses compared with conventional solid lenses result from their low weight, reduced cost, short focal distance in relation with their dimensions, as well as the sharpness of their focus and the possibility of correcting the spherical aberration, since it is possible to vary the exit angle of the light rays.

The whole assembly described above may turn by means of turning mechanisms (30) for the perfect tracking of the solar trajectory, which, together with the previously delimited context, permits the movement of the divergent lens (22) and the liquid prism (23) along the curved structure (23) following the condensed focus, achieving the reception of the solar rays in the most suitable way.

The solar energy condenser on a moving structure is provided with an element for the generation of heat by combustion (29) which can supplement the lack of solar energy in periods of low radiation or during the night and can be constituted in any way and by means of any application which is considered appropriate, such as an element, device or annex to the installation, powered by energies of any type.

Furthermore, the condenser, which will be hermetically sealed, will be provided with equipment for the recovery of residual heat (34) for different uses.

I claim:

1. A modular liquid lens for condensing solar energy, said lens comprising lenticular recipients having shapes and dimensions for providing a reduced focus of solar flux corresponding to large surface areas, said lenticular recipients being transparent and susceptible to molding and containing in their interior a refracting fluid, wherein the modular lens can have a convergent or divergent shape, wherein the modular lens is placed on a moving solar tracking structure and wherein the modular lens is formed by connecting a plurality of full or partial toric bodies of revolution generated by a section of the lenticular recipients, engendered by the surface area comprised between the intersection of two nonconcentric circles turning on the axis of an exterior circle, said circles being extendible when the interior circle is substituted by a straight or broken line turning on the axis of the exterior circle.

2. A modular liquid lens for condensing solar energy, said lens comprising lenticular recipients having shapes and dimensions for providing a reduced focus of solar flux corresponding to large surface areas, said lenticular recipients being transparent and susceptible to molding and containing in their interior a refracting fluid, wherein said fluid can withstand the climatological condition to which it will be subjected, wherein the modular lens can have a convergent or divergent shape, and wherein the modular lens can be placed on a moving solar tracking structure or a fixed structure without solar tracking.

3. A condenser of solar energy on a moving structure, provided with one or several modular liquid lenses, concentrators of solar rays, being provided in their interior with a divergent lens which intercepts the light source and converts it into a beam of parallel rays which impinge upon a liquid prism which refracts the beam towards an absorbent which heats up and cedes the energy to the fluid which circulates through a primary circuit which, by means of an exchanger, transmits the heat to the secondary fluid, evaporating it at high pressure and temperature for its energy application, and being provided with a sliding rail along which the assembly formed by the prism and the divergent lens moves, tracking the light source by means of the action of an appropriate tracking system.

4. A condenser of solar energy, in accordance with claim 3, wherein the absorber comprises a vacuum chamber which surrounds it; and at least one selective window in communication with the interior of the absorber, permitting the passing of the light beam which comes from the liquid prism.

5. A condenser of solar energy on a moving structure, in accordance with claim 3 or 4, wherein said condenser is able to perform a turning movement tracking the solar trajectory, by means of the incorporation of turning elements.

6. A modular liquid lens for condensing solar energy, said lens comprising lenticular recipients having shapes and dimensions for providing a reduced focus of solar flux corresponding to large surface areas, said lenticular recipients being transparent and susceptible to molding and containing in their interior a refracting fluid, wherein the modular lens is coupled to a moving solar tracking structure and has a partially developed toric shape having a wide angle capacity and wherein the modular lens can be placed in the moving solar tracking structure or a fixed structure without solar tracking.

7. A modular liquid lens for condensing solar energy, said lens comprising lenticular recipients having shapes and dimensions for providing a reduced focus of solar flux corresponding to large surface areas, said lenticular recipients being transparent and susceptible to molding, said lenticular recipient being made from a material selected from the materials consisting of glass, organic plastics and inorganic materials, wherein said lenticular recipients contain in their interior a refracting fluid, wherein the modular lens comprise a convergent or divergent shape and a plan shape selected from the group of shapes consisting of circular, polygonal, elliptic and parabolic shapes, and wherein the modular lens can be placed on a moving solar tracking structure or a fixed structure without solar tracking.

8. A modular liquid lens for condensing solar energy, said lens comprising lenticular recipients having shapes and dimensions for providing a reduced focus of solar flux corresponding to large surface areas, said lenticular recipients being transparent and susceptible to molding and containing in their interior a refracting fluid, wherein said recipients define a central lenticular disc and several lenticular crowns which surround said disc forming a dome shaped structure, wherein the modular lens can have a convergent or divergent shape, and wherein the modular lens can be placed on a moving solar tracking structure or a fixed structure.

9. A modular liquid lens for condensing solar energy comprising:

a plurality of lenticular recipients arranged to form the lens having a toric shaped outer surface; and a refractory within each of the lenticular lens.

10. A modular liquid lens in accordance with claim 9, wherein the lenticular recipients are subdivided horizontally, vertically or transversely in their interior in order to be filled or emptied simultaneously or alternatively with the refracting fluid according to the needs of obtaining different focal distances with the same lens, said recipients being provided with the necessary orifices and connections in their faces.

11. A modular liquid lens in accordance with claim 9, wherein the color and texture of the lenticular recipients permit the concentration of solar light with the maximum efficiency, and wherein it is possible to incorporate any material, product or antireflective device, both on the surface and within the refracting fluid.

12. A modular liquid lens in accordance with claim 9, further comprising fastening and hinging elements to facilitate static and dynamic harnessing of the solar flux.

13. A modular liquid lens in accordance with claim 9, wherein the lenticular recipients are subdivided horizontally.

14. A modular liquid lens in accordance with claim 9, wherein the refracting fluid comprises a fluid selected from the group of fluids consisting of gas, water, semiliquid and solidifiable fluids.

15. A modular liquid lens, condenser of solar energy, in accordance with claim 9 comprising a series of recipients which form a central lenticular disc and several lenticular crowns which surround it, all of them assembled together by means of the provision of a reticular structure which gives it a spherical or cylindrical form, conforming it as a dome or vault respectively.

16. A modular liquid lens as recited in claim 9 wherein the lenticular recipients define at least a partial toric body of revolution.

17. A modular liquid lens as recited in claim 9 wherein the fluid is a fluid capable of withstanding a wide range of climatic conditions.

18. A modular liquid lens as recited in claim 9 wherein the lenticular recipients form a wide angle modular lens for mounting on a electromechanical solar tracking equipment.

* * * * *